(12) United States Patent
Nakao et al.

(10) Patent No.: US 12,242,654 B2
(45) Date of Patent: Mar. 4, 2025

(54) ELECTRONIC DEVICE, LIBRARY, AND PROCESSING METHOD

(71) Applicants: Yuuya Nakao, Kanagawa (JP); Hiroki Asakimori, Tokyo (JP); Takuya Inoue, Kanagawa (JP)

(72) Inventors: Yuuya Nakao, Kanagawa (JP); Hiroki Asakimori, Tokyo (JP); Takuya Inoue, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 501 days.

(21) Appl. No.: 17/651,443

(22) Filed: Feb. 17, 2022

(65) Prior Publication Data

US 2022/0269804 A1 Aug. 25, 2022

(30) Foreign Application Priority Data

Feb. 25, 2021 (JP) .................................. 2021-028666

(51) Int. Cl.
G06F 21/62 (2013.01)
G06F 8/65 (2018.01)
G06F 8/71 (2018.01)
G06F 21/31 (2013.01)

(52) U.S. Cl.
CPC .............. *G06F 21/629* (2013.01); *G06F 8/65* (2013.01); *G06F 8/71* (2013.01); *G06F 21/31* (2013.01)

(58) Field of Classification Search
None
See application file for complete search history.

(56) References Cited

U.S. PATENT DOCUMENTS

| | | | |
|---|---|---|---|
| 2004/0057067 A1 | 3/2004 | Ohishi et al. | |
| 2012/0227061 A1* | 9/2012 | Hunt | G06F 8/71 719/331 |
| 2013/0054960 A1* | 2/2013 | Grab | H04L 63/0884 726/17 |
| 2013/0167214 A1* | 6/2013 | Sanno | H04L 63/1441 726/7 |
| 2015/0074644 A1* | 3/2015 | Oberheide | G06F 16/2455 717/122 |
| 2015/0135170 A1* | 5/2015 | Murray | G06F 9/44536 717/148 |
| 2015/0188907 A1* | 7/2015 | Khalid | H04L 63/0815 726/8 |
| 2016/0239279 A1* | 8/2016 | Goetz | G06F 9/44536 |
| 2018/0267753 A1 | 9/2018 | Asakimori et al. | |
| 2019/0386985 A1* | 12/2019 | Towata | H04L 63/0815 |
| 2020/0162627 A1 | 5/2020 | Utoh et al. | |
| 2020/0177758 A1 | 6/2020 | Asakimori | |
| 2020/0233614 A1 | 7/2020 | Nakao | |
| 2022/0232139 A1* | 7/2022 | Dasaraju | H04N 1/00854 |

FOREIGN PATENT DOCUMENTS

| | | |
|---|---|---|
| JP | 2004-098658 | 4/2004 |
| JP | 2015-056137 | 3/2015 |

\* cited by examiner

*Primary Examiner* — Christopher C Harris
(74) *Attorney, Agent, or Firm* — IPUSA, PLLC

(57) ABSTRACT

An electronic device includes circuitry and a memory storing computer-executable instructions that cause the circuitry to execute an application operating on a platform of the electronic device. The application includes a library, and the library controls whether to perform a predefined process, based on version information of the platform acquired from the platform.

5 Claims, 11 Drawing Sheets

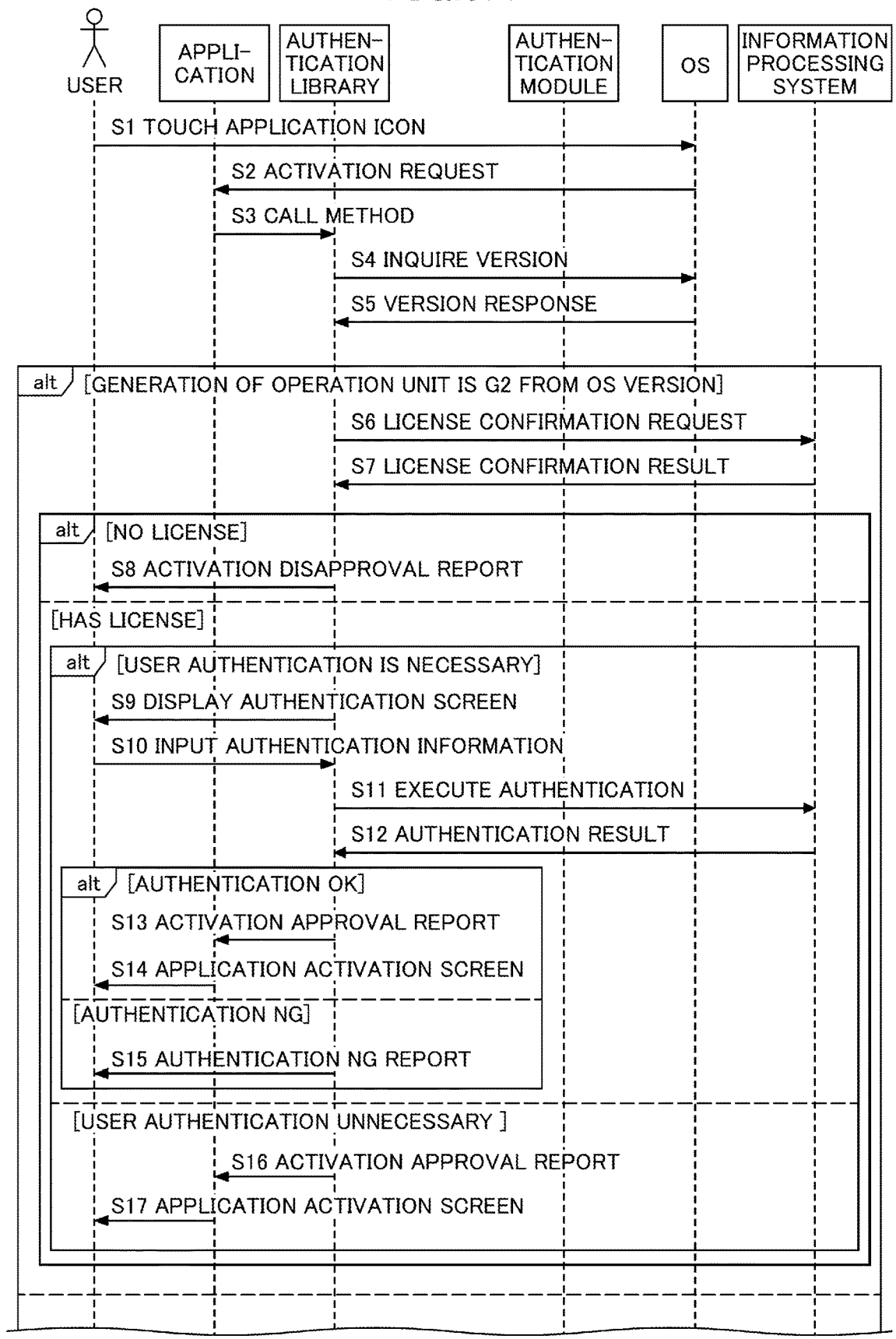

FIG.10

```
public static boolean isG2(){
  //G1: Android2.3.3
  //G2: Android4.2.3
  //G2.5: Android6.0.1
  Log.d(TAG,"BuildVersion="+ Build.VERSION.SDK_INT);
  if(OS VERSION < 6.01){
    return true;
  }
  return false;
}
```

ELECTRONIC DEVICE, LIBRARY, AND PROCESSING METHOD

CROSS-REFERENCE TO RELATED APPLICATION

The present application is based on and claims priority under 35 U.S.C. § 119 to Japanese Patent Application No. 2021-028666, filed on Feb. 25, 2021, the contents of which are incorporated herein by reference in their entirety.

BACKGROUND OF THE INVENTION

1. Field of the Invention

The present invention relates to an electronic device, a library, and a processing method.

2. Description of the Related Art

In an electronic device such as an image forming apparatus, various applications operate on a platform such as an operating system (OS). A user can install applications according to his or her needs and a single electronic device can provide a variety of functions.

The version of the platform may be upgraded to add or modify a function, make improvements to address failures, improve the security, and the like. When the version of the platform is upgraded, the functions of the platform available for use from an application and the usage method of the platform will change, and, therefore, there may be cases where the application has a configuration that is compatible with each version of the platform. That is, the version of the application may be upgraded according to the version of the platform.

In some cases, a method is adopted in which the functions commonly used by multiple applications are extracted as a library, and the library and the applications are developed separately. Because the developer of the application does not have to develop a function corresponding to the library, the development processes can be reduced. The developer of the application and the library would want to reduce the number of changes to be made to the application or the library, that are required when the version of the platform is upgraded.

A technique has been devised to enable an execution module of an old platform to operate normally, even when a transition is made to a successor platform (see, for example, Patent Document 1). Patent Document 1 discloses an information processing method in which an execution module of an old OS version is operated even when a transition is made to a new OS version, by not recompiling the execution module of the old OS version.

Patent Document 1: Japanese Unexamined Patent Application Publication No. 2015-056137

SUMMARY OF THE INVENTION

According to one aspect of the present invention, there is provided an electronic device including circuitry; and a memory storing computer-executable instructions that cause the circuitry to execute executing an application operating on a platform of the electronic device, wherein the application includes a library, and the library controls whether to perform a predefined process, based on version information of the platform acquired from the platform.

BRIEF DESCRIPTION OF THE DRAWINGS

FIG. 9A is an example of a sequence diagram illustrating how the authentication library switches the authentication process according to the version of the OS according to an embodiment of the present invention;

FIG. 10 is a diagram illustrating an example of a format of a version query according to an embodiment of the present invention.

DESCRIPTION OF THE EMBODIMENTS

The conventional technology has a problem of requiring a library corresponding to the version of the platform. That is, when the version of the platform is upgraded from N to N+α, the version of the library also needs to be upgraded, and the developer of the library may need to develop a library in accordance with the upgrade of the version of the platform.

A problem to be addressed by an embodiment of the present invention is to provide an electronic device capable of using a library of the same version even when the version of the platform changes.

Hereinafter, as an example of an embodiment of the present invention, an electronic device and a processing method performed by the electronic device will be described with reference to the drawings.

<Outline of Operation by Electronic Device>

Figure 1A:
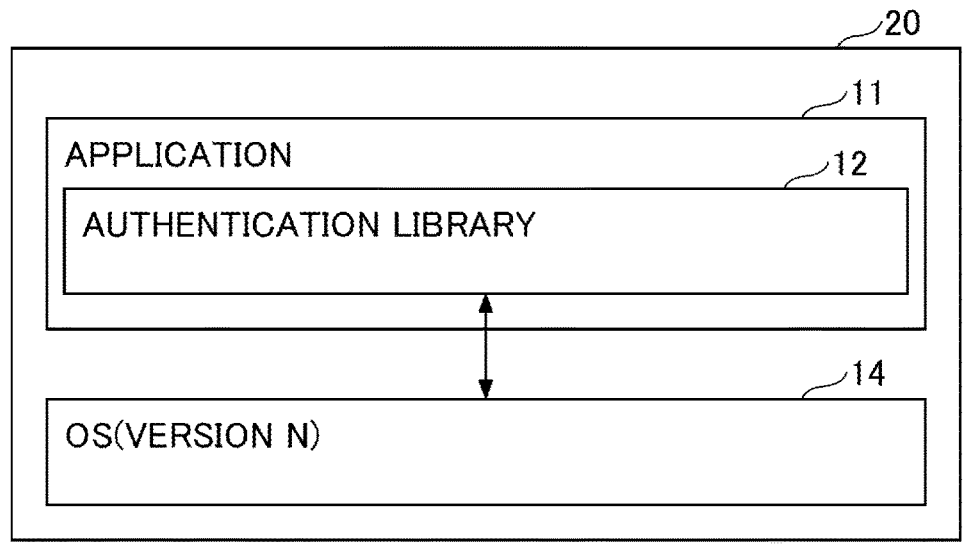
FIGS. 1A and 1B are examples of schematic configuration diagrams of software operating in an electronic device according to an embodiment of the present invention.
Figure 1B:
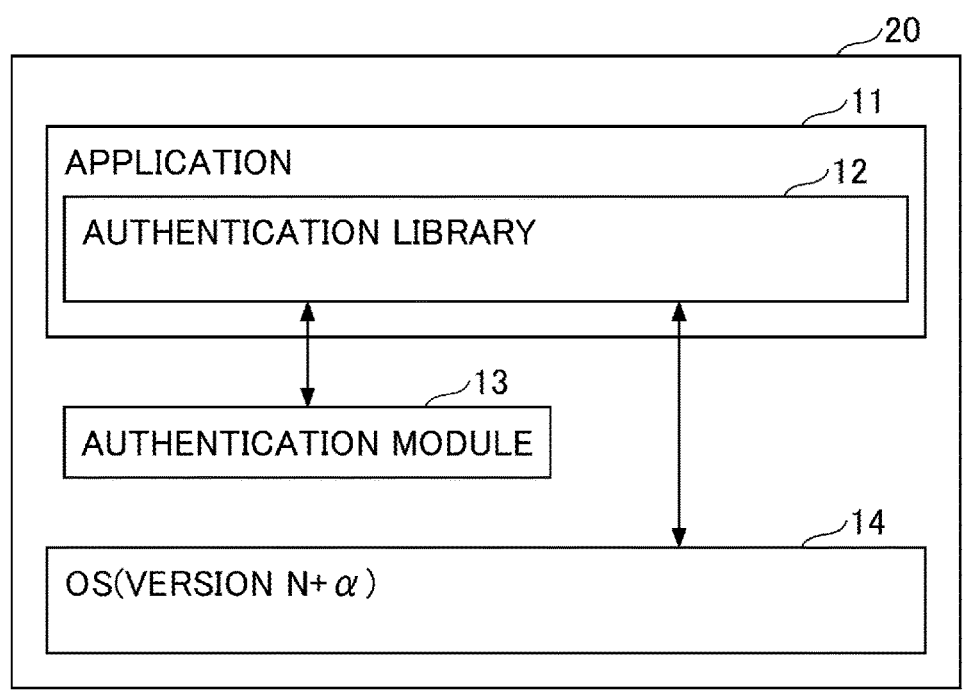

FIGS. 1A and 1B are an example of a schematic configuration diagram of software operating in an electronic device 20. FIG. 1A illustrates the software configuration before the version upgrade of the OS, and FIG. 1B illustrates the software configuration after the version upgrade of the OS.

An application 11 includes an authentication library 12. The authentication library 12 can be commonly used from each of the applications 11, and, therefore, the processes for developing the application 11 can be reduced.

A case where the authentication library 12 performs processing relating to user authentication, for example, will be described. If user authentication is successful, user authentication can be omitted for a certain period of time to improve operability. However, if the applications 11 separately include the authentication library 12, the other applications 11 cannot use the authentication result included in the authentication library 12 for which the authentication has been successful. That is, even when the user intends to use the application 11 (or another application) within a certain period of time after the user logs in to the information processing system described below in order to use the application 11, there may be cases where the user needs to log in again to the information processing system.

Accordingly, as illustrated in FIG. 1B, an authentication module 13 has been added to the electronic device 20 by the developer of the authentication library 12 in accordance with the version upgrade of the OS. The authentication module 13 may be added in either a case where the authentication module 13 has become available for use due to the version upgrade of the OS, or a case of using the authentication module 13 regardless of the version upgrade of the OS.

The authentication library 12 cooperates with the authentication module 13 to perform processing relating to the authentication when a user logs in to an information processing system. Each of the applications 11 can use the authentication module 13, and, therefore, if the user's authentication is successful, the user's authentication can be omitted for a certain period of time.

On the other hand, with regard to the authentication library 12, even if the version of the OS is changed, the library of the same version is available for use, and, therefore, an increase in the development processes can be prevented. However, the authentication library 12 cannot determine whether the authentication library 12 is to perform the authentication process or whether the authentication library 12 is to cooperate with the authentication module 13 (whether the authentication module 13 is present).

Accordingly, the authentication library 12 sends a query to the OS to inquire the version of the OS, in order to determine whether the authentication module 13 is present. The authentication library 12 determines whether the authentication module 13 is present, according to the version of the OS. Then, if the authentication module 13 is present, the authentication library 12 requests the authentication module 13 to perform a process relating to user authentication, and if the authentication module 13 is not present, the authentication library 12 performs a process relating to user authentication.

Such processing allows the electronic device 20 to use the authentication library 12 having the same function, regardless of the version of the platform, such as the OS. The authentication library 12 can be the same, and, therefore, the developer of the application 11 can release the application 11 of the same binary, even when the version of the OS is changed, and development costs and maintenance costs can be expected to be reduced. Also, the developer of the authentication library 12 can integrate the authentication libraries 12 to be developed or maintained regardless of the version of the platform, such as the OS, and, therefore, development costs and maintenance costs can be expected to be reduced.

<Terminology>

A platform is a fundamental part of a computer where programs are operated, mainly including the operating system and basic hardware.

A library is a collection of highly versatile programs that can be reused.

Version information is a number or symbol assigned to represent the stage of revision of the revised software. For example, a build number may be used. A build number is a number or symbol assigned to identify an executable program that has been built (to generate an executable program by compiling, assembling, linking, etc.).

A predefined process may be a process provided in the library. In the present embodiment, the predefined process is an authentication process.

<System Configuration>

Figure 2:
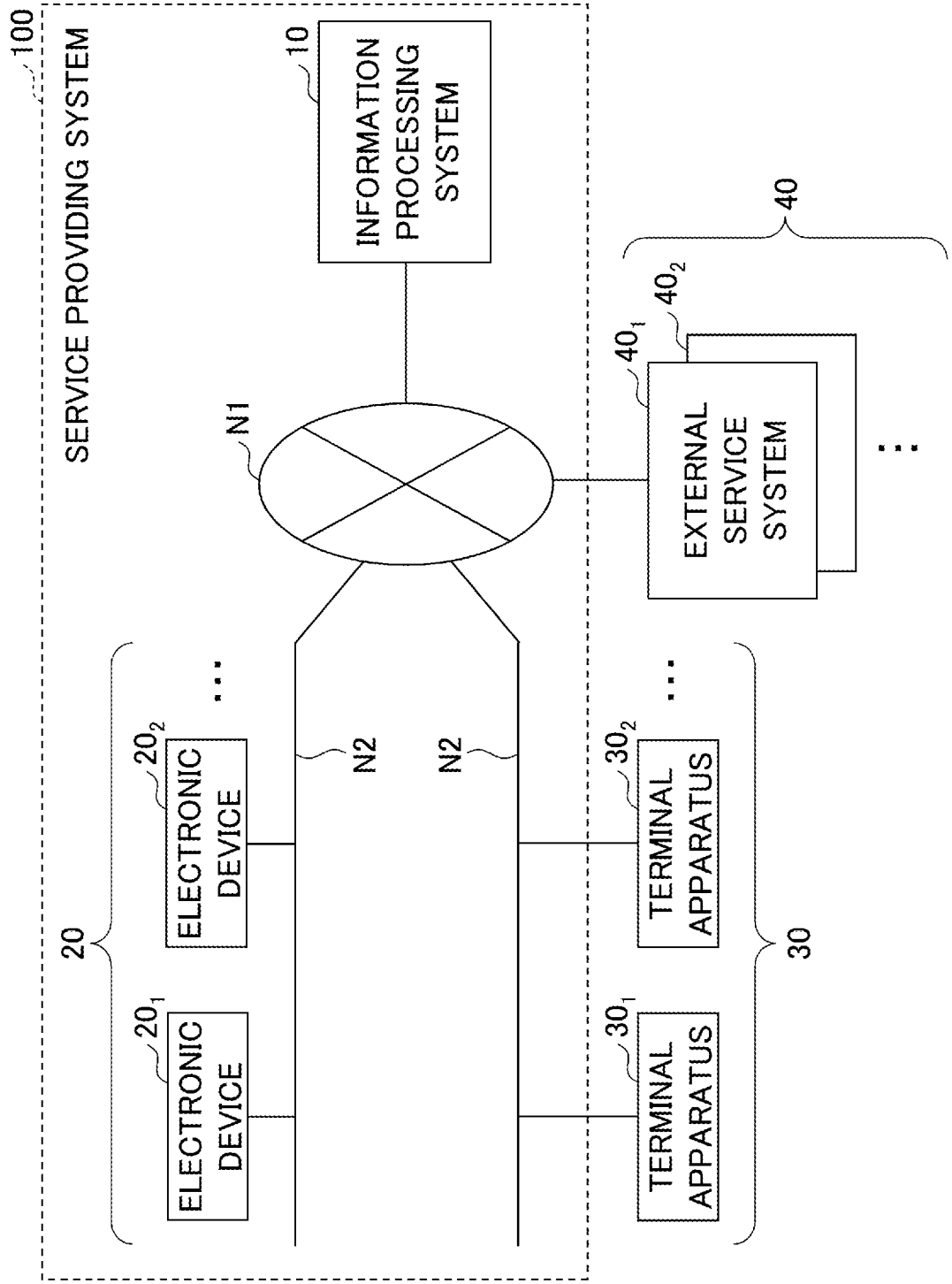
FIG. 2 is a diagram illustrating an exemplary system configuration of a service providing system according to an embodiment of the present invention.

A system configuration of a service providing system 100 according to the present embodiment will be described with reference to FIG. 2. FIG. 2 is a diagram illustrating an exemplary system configuration of the service providing system 100 according to the present embodiment.

The service providing system 100 illustrated in FIG. 2 includes an information processing system 10, the electronic device 20, and a terminal apparatus 30, which are communicatively connected via a wide-area network N1 such as the Internet. The service providing system 100 communicates with an external service system 40, which is an external system.

The information processing system 10 is implemented by one or more information processing apparatuses and provides various services implemented by a series of processes in cooperation with the external service system 40 such as a cloud service via the network N1. The service providing system 100 allows users and dealers to easily and quickly develop and provide solutions corresponding to the types of industries and businesses of customers by using the electronic device 20.

The information processing system 10 according to the present embodiment provides a service that is a process in which, for example, the image data scanned by the electronic device 20 is stored in the external service system 40 or the image data stored in the external service system 40 is printed by the electronic device 20.

The information processing system 10 may be implemented by cloud computing or by a single information processing apparatus. Cloud computing is a form in which resources on a network are used without considering specific hardware resources. The information processing system 10 may be present on the Internet or may be on-premise. A series of processes is provided by a single application. The series of processes is also referred to as a "process flow" or "workflow." The application may be a native application or a web application.

The electronic device 20 has the functions of an information processing apparatus and may be various devices used by a user. The electronic device 20 may be, for example, an image forming apparatus such as a multifunction peripheral (MFP), a projector, an electronic blackboard, a video conference terminal, a digital camera, or the like. The electronic device 20 is connected to a network N2. Users may use the electronic device 20 to use various services provided by the information processing system 10 or the external service system 40.

Hereafter, when distinguishing each of the plurality of the electronic devices 20, these are denoted with a subscript as the "electronic device $20_1$", "electronic device $20_2$", and the like.

The terminal apparatus 30 may be, for example, a desktop personal computer (PC), a notebook PC, a smartphone, a tablet terminal, or the like used by an administrator or user. The terminal apparatus 30 is connected to the network N2.

The administrator or user may operate the terminal apparatus 30 to use various services provided by the information processing system 10 or the external service system 40, and to set applications.

Hereinafter, when distinguishing each of the plurality of terminal apparatuses 30, these are denoted with a subscript as the "terminal apparatus $30_1$", the "terminal apparatus $30_2$", and the like.

The external service system 40 is one or more information processing apparatuses that provide services by executing an application via the network N1. By executing an application, data is stored, read, and the like. The term "external" in the external service system 40 indicates that this is a system that is different from the information processing system 10. The external service system 40 is operated by a different company in many cases. For example, the same user may have different accounts in the case of the external service system 40 and in the case of the information processing system 10.

An example of the external service system 40 may be, for example, a cloud service, an Application Service Provider (ASP), or the like, and may include a variety of external services provided via the network. For example, one example of a service is a tabular database. The external service system 40 may be present on the Internet or may be on-premise.

Hereinafter, when distinguishing each of the plurality of external service systems 40, the "external service system $40_1$" illustrated in the figure is described as an external service system A, the "external service system $40_2$" is described as the external service system B, and so on.

<Example of Hardware Configuration>

Figure 3:
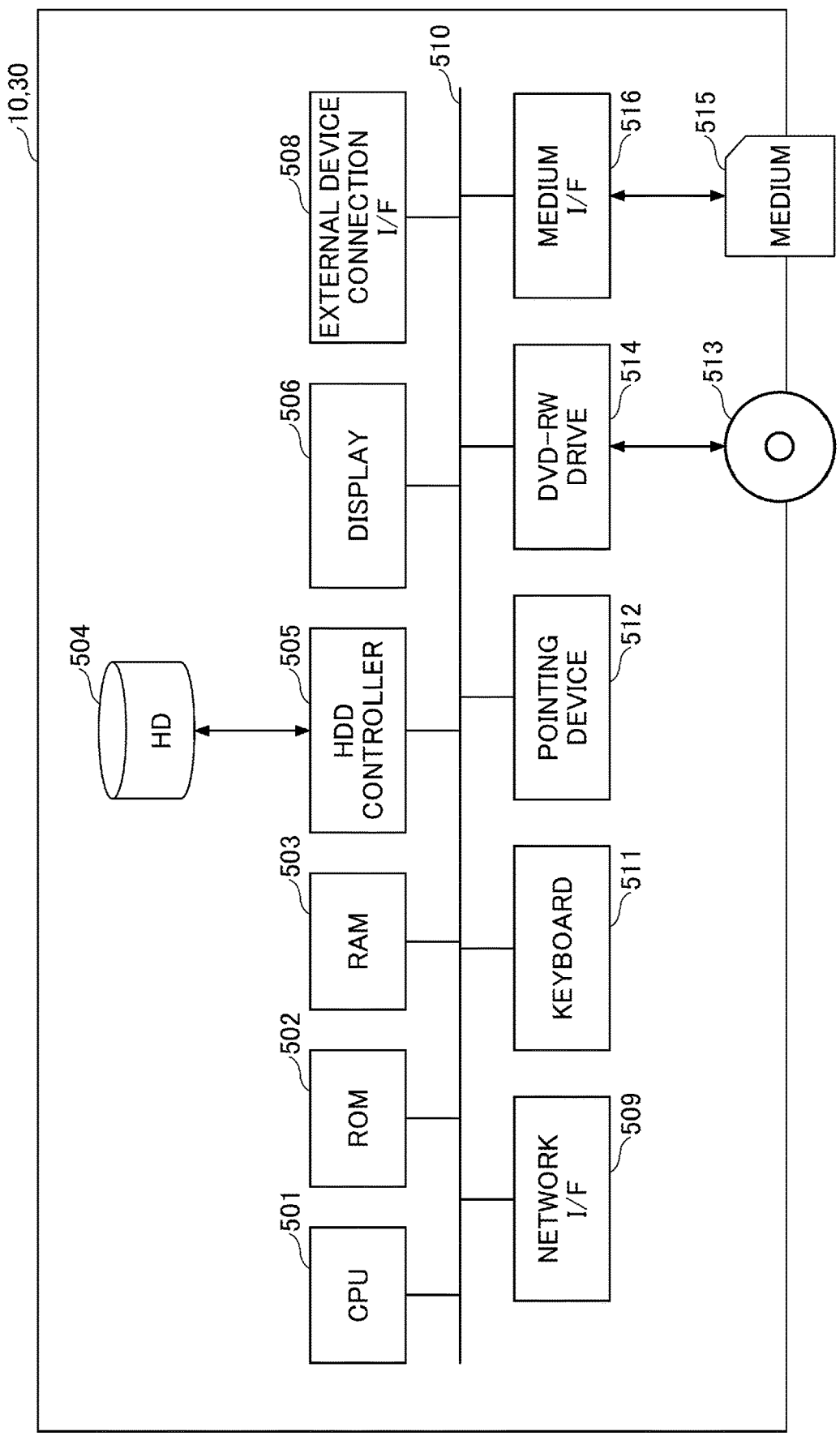
FIG. 3 is a diagram illustrating an exemplary hardware configuration of an information processing system and a terminal apparatus according to an embodiment of the present invention.

Referring to FIG. 3, the hardware configuration of the information processing system 10 and the terminal apparatus 30 included in the service providing system 100 according to the present embodiment will be described.

<<Information Processing System and Terminal Apparatus>>

FIG. 3 is a hardware configuration diagram of the information processing system 10 and the terminal apparatus 30 according to the present embodiment. As illustrated in FIG. 3, the information processing system 10 and the terminal apparatus 30 are configured by a computer and includes a central processing unit (CPU) 501, a read-only memory (ROM) 502, a random access memory (RAM) 503, a hard disk (HD) 504, a hard disk drive (HDD) controller 505, a display 506, an external device connection I/F (interface) 508, a network I/F 509, a bus line 510, a keyboard 511, a pointing device 512, a digital versatile disc rewritable (DVD-RW) drive 514, and a medium I/F 516.

Among these, the CPU 501 controls the operation of the entire the information processing system 10 and the terminal apparatus 30. The ROM 502 stores a program used to drive the CPU 501, such as an initial program loader (IPL). The RAM 503 is used as the work area of the CPU 501. The HD 504 stores various kinds of data such as a program. The HDD controller 505 controls the reading or writing of various kinds data from and to the HD 504 according to the control of the CPU 501. The display 506 displays various kinds of information such as cursors, menus, windows, characters, images, or the like. The external device connection I/F 508 is an interface for connecting various external devices. In this case, the external device may be, for example, a USB memory or a printer. The network I/F 509 is an interface for performing data communication by using the network N2. The bus line 510 is an address bus, a data bus, or the like for electrically connecting elements such as the CPU 501 illustrated in FIG. 3.

The keyboard 511 is a type of input means including a plurality of keys used for inputs such as characters, numbers, various instructions, or the like. The pointing device 512 is a type of input means for selecting and executing various instructions, selecting a processing target, moving a cursor, and the like. The DVD-RW drive 514 controls the reading or writing of various kinds of data from or to the DVD-RW 513 as an example of a removable recording medium. The DVD-RW drive 514 is not limited to corresponding to a DVD-RW but may be corresponding to a Digital Versatile Disc Recordable (DVD-R) or the like. The medium I/F 516 controls the reading or writing (storage) of data from or to a recording medium 515, such as a flash memory.

<<Electronic Device>>

Figure 4:
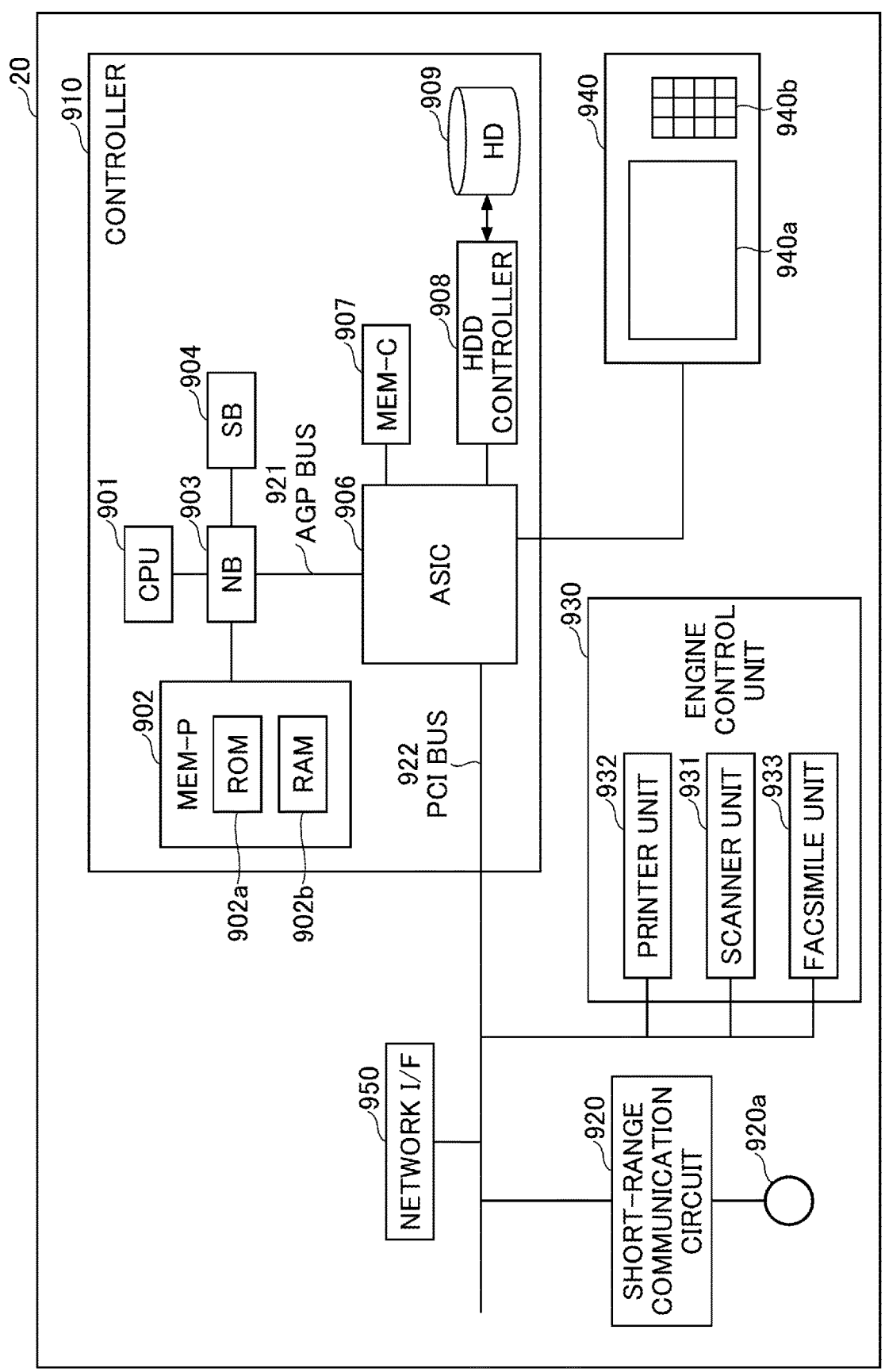
FIG. 4 is a hardware configuration diagram illustrating an image forming apparatus as an example of an electronic device according to an embodiment of the present invention.

FIG. 4 is a hardware configuration diagram illustrating an image forming apparatus that is an example of the electronic device 20. As illustrated in FIG. 4, the image forming apparatus includes a controller 910, a short-range communication circuit 920, an engine control unit 930, an operation panel 940, and a network I/F 950.

Among these, the controller 910 includes a CPU 901, a system memory (MEM-P) 902, a northbridge (NB) 903, a south bridge (SB) 904, an ASIC (Application Specific Integrated Circuit) 906, a local memory (MEM-C) 907, a HDD controller 908, and a HD 909 that is a storage unit, which are the main part of the computer. The NB 903 and the ASIC 906 are connected by an Accelerated Graphics Port (AGP) bus 921.

Among these, the CPU 901 is a control unit that performs the overall control of the image forming apparatus. The NB 903 is a bridge for connecting the CPU 901 to the MEM-P 902, the SB 904, and the AGP bus 921 and has a memory controller for controlling reading and writing from and to the MEM-P 902, a PCI (Peripheral Component Interconnect) master, and an AGP target.

The MEM-P 902 includes a ROM 902a, which is a memory for storing programs and data for implementing each function of the controller 910, and a RAM 902b, which is used for loading a program or data, and is used as a rendering memory at the time of memory printing, and the like. The program stored in the RAM 902b may be configured to be provided by being recorded in a computer-readable recording medium such as a compact disc read-only memory (CD-ROM), a CD recordable (CD-R), a digital versatile disc (DVD) or the like, in a file in an installable format or an executable format.

The SB 904 is a bridge for connecting the NB 903 to the PCI devices and peripheral devices. The ASIC 906 is an integrated circuit (IC) for image processing applications including hardware elements for image processing, and serves as a bridge connecting the AGP bus 921, a PCI bus 922, the HDD controller 908, and the MEM-C 907. The ASIC 906 includes a PCI target and AGP master, an arbitrator (ARB) that forms the core of the ASIC 906, a memory controller that controls the MEM-C 907, a plurality of DMACs (Direct Memory Access Controllers) that rotate image data by hardware logic, and a PCI unit that transfers data between a scanner unit 931, a printer unit 932, and a facsimile unit 933 via the PCI bus 922. The ASIC 906 may include an interface such as USB (Universal Serial Bus) or IEEE 1394 (Institute of Electronic and Electronic Engineers 1394).

The MEM-C 907 is a local memory used as an image buffer for copying and a code buffer. The HD 909 is a storage device for storing image data, storing font data used for printing, and storing forms. The HD 909 controls the reading or writing of data from or to the HD 909 according to the control of the CPU 901. The AGP bus 921 is a proposed bus interface for graphics accelerator cards to speed up graphics processing, and by directly accessing the MEM-P 902 with high throughput, the graphics accelerator card can be made faster.

The short-range communication circuit 920 is provided with an antenna 920a of the short-range communication circuit. The short-range communication circuit 920 is a communication circuit such as that of Near Field Communication (NFC), Bluetooth (registered trademark), or the like.

The engine control unit 930 further includes the scanner unit 931, the printer unit 932, and the facsimile unit 933. The operation panel 940 includes a panel display unit 940a, such as a touch panel, for displaying a current setting value, a selection screen, or the like, and for receiving input from an operator; and hard keys 940b, including a numeric pad for receiving a setting value of an image forming condition, such as a density setting condition, a start key for receiving a copy start instruction, and the like. The controller 910 controls the entire image forming apparatus and controls, for example, rendering, communication, input from the operation panel 940, and the like. The scanner unit 931 or the printer unit 932 includes an image processing unit that performs processes such as error diffusion or gamma conversion.

The image forming apparatus can sequentially switch between functions and select a function, such as a document box function, a copy function, a printer function, and a facsimile function, by using an application switching key of the operation panel 940. In the image forming apparatus, the document box mode is set when the document box function is selected by the user, the copy mode is set when the copy function is selected by the user, the printer mode is set when the printer function is selected by the user, and the facsimile mode is set when the facsimile mode is selected by the user.

The network I/F 950 is an interface for performing data communication by using the network N2. The short-range communication circuit 920 and the network I/F 950 are electrically connected to the ASIC 906 via the PCI bus 922.

<Relationship Between the Main Unit and the Operation Panel of the Electronic Device>

Figure 5:
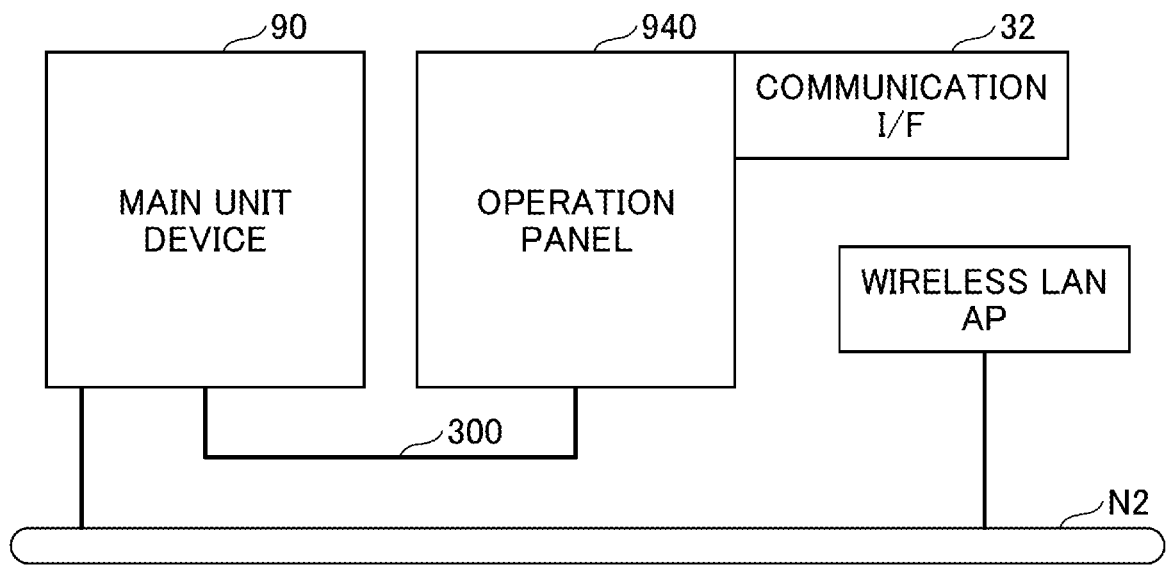
FIG. 5 is a schematic diagram illustrating an example of a software configuration of a main unit device and an operation panel of an electronic device according to an embodiment of the present invention.

Next, the software configuration of the electronic device 20 will be described with reference to FIG. 5. FIG. 5 is a schematic diagram illustrating an example of the software configuration of a main unit device 90 and the operation panel 940 of the electronic device 20. The main unit device 90 and the operation panel 940 each have functions of an information processing apparatus that are independent from each other.

The main unit device 90 provides the primary functions of the electronic device 20. The primary functions are functions that involve control of hardware for image formation, scanning, and the like, used in functions such as copying, printing, fax transmission/reception, and the like. The operation panel 940 provides a user interface of the electronic device 20. The network communication may be provided by either the main unit device 90 or the operation panel 940. The main unit device 90 communicates with the information processing system 10 via the network N2, and the operation panel 940 communicates with the information processing system 10 via a communication I/F 32.

Accordingly, in the main unit device 90 and the operation panel 940, separate operating systems (OS) operate independently of each other. For example, Linux (registered trademark) may be used as the software for the OS of the main unit device 90, and Android (registered trademark) may be used as the software for the OS layer of the operation panel 940. Note that the OS of the main unit device 90 and the OS of the operation panel 940 may be the same, and the above-mentioned operating systems are only examples.

In the electronic device 20 according to the present embodiment, the main unit device 90 and the operation panel 940 operate in separate operating systems, and, therefore, the communication between the main unit device 90 and the operation panel 940 via a communication path 300 is performed not as inter-process communication within a device but as communication between different devices. The operation of transmitting the information (the instruction contents from the user) received by the operation panel 940 to the main unit device 90 (command communication) or the operation of reporting an event to the operation panel 940 by the main unit device 90 correspond to such communication. The operation panel 940 performs command communication to the main unit device 90, thereby allowing a user to use the functions of the main unit device 90. The contents of the information reported to the operation panel 940 from the main unit device 90 include the execution status of operations at the main unit device 90 and the contents set at the main unit device.

Power is supplied to the operation panel 940 from the main unit device 90 via the communication path 300, and, therefore, power control of the operation panel 940 can be performed separately from (independently of) the power control of the main unit device 90.

<Functions>

Figure 6:
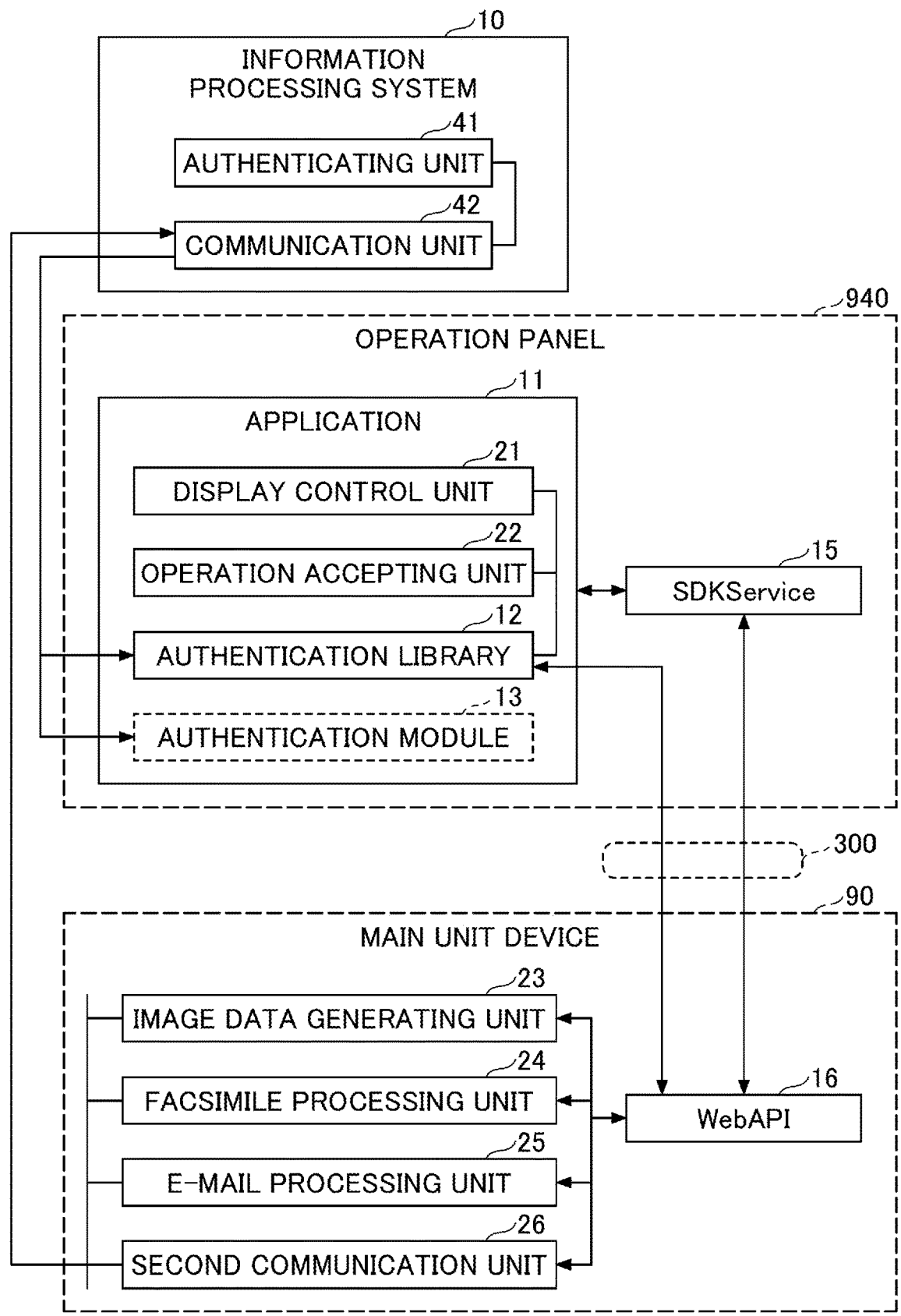
FIG. 6 is a diagram illustrating an exemplary functional configuration of a service providing system according to an embodiment of the present invention.

FIG. 6 is a diagram illustrating an exemplary functional configuration of the service providing system 100 according to the present embodiment.

<<Electronic Device>>

The operation panel 940 of the electronic device 20 includes the application 11 and an SDK (Software Development Kit) service 15. The operation panel 940 includes the authentication module 13 if the version of the OS is N+α, and does not include the authentication module 13 if the version of the OS is N.

The applications 11 operating on the operation panel 940 are diverse, but may be, for example, a copy application, a printer application, a scanner application, a fax application, and the like. The application 11 may be a web application that uses these functions.

A display control unit 21 and an operation accepting unit 22 of the application 11 are functions or means implemented by the CPU of the operation panel 940 by executing instructions included in one or more of the applications 11 installed in the electronic device 20.

The display control unit 21 interprets screen information of various screens and displays the screen information on the panel display unit 940a. The operation accepting unit 22 receives various operations of a user on various screens displayed on the panel display unit 940a. The authentication library 12, the authentication module 13, and the SDK service 15 will be described later.

The main unit device 90 of the electronic device 20 includes an image data generating unit 23, a facsimile processing unit 24, an e-mail processing unit 25, a second communication unit 26, and a web API (Application Programming Interface) 16.

Each of these functional units is a function or means implemented by the CPU 901 by executing instructions included in one or more programs installed in the main unit device of the electronic device 20.

When the operation panel 940 does not have a function to communicate with the information processing system 10, the second communication unit 26 transmits and receives various kinds of information to and from the information processing system 10. Accordingly, the second communication unit 26 may transmit and receive the authentication-related information to and from the information processing system 10.

When the application, for which the operation accepting unit 22 has received a selection, is for generating the image data, the image data generating unit 23 scans a document by the scanner unit 931 and generates image data. The facsimile processing unit 24 performs processing related to reception and transmission of a facsimile by the facsimile unit 933 and requests the information processing system 10 to execute an application which has been previously associated, when a facsimile is received. The facsimile processing unit 24 may request an application corresponding to the transmission source (fax number) of the facsimile.

The e-mail processing unit 25 performs processing relating to the transmission and reception of an e-mail and requests the information processing system 10 to execute an application that has been previously associated, when an e-mail is received. The e-mail processing unit 25 may request an application corresponding to the e-mail transmission source (e-mail address).

The web API 16 receives a request for each function provided by the main unit device 90 from the operation panel 940 via HTTP communication, and provides the function. If an API (Application Programming Interface) is specified as the operation panel 940, the operation panel 940 may use the functions of the main unit device 90 without implementing a detailed control method for the hardware of the main unit device 90.

<<Information Processing System>>

The information processing system 10 includes a communication unit 42 and an authenticating unit 41. Each of these functional units is a function or means implemented by the CPU 501 by executing instructions included in one or more programs installed in the information processing system 10. In FIG. 6, the functions of the information processing system 10 not described in the present embodiment are omitted. The information processing system 10 has various functions other than those illustrated, for example, functions used during the execution of a workflow.

The communication unit 42 transmits and receives various kinds of information with the electronic device 20 and the terminal apparatus 30. In the present embodiment, the communication unit 42 primarily transmits and receives information related to authentication.

The authenticating unit 41 performs processing relating to the authentication of the user and the electronic device 20. The authenticating unit 41 stores authentication information such as a user name or a password and performs authentication of a user based on the consistency with authentication information such as a user name and a password transmitted from the electronic device 20. Further, device authentication information is used to authenticate the electronic device 20. The electronic device 20 previously stores device authentication information. The device authentication information is information indicating that the electronic device 20 is located at the tenant and has been authenticated. Therefore, even if the user can log in to the information processing system 10, the application cannot be executed from the electronic device 20 without the device authentication information.

The authenticating unit 41 issues a token upon successful authentication. A token is authority information of a user. The token is associated with the user who has logged in with the authentication information. Alternatively, the token may include information by which a user can be identified. The user's authority (information that the user can access, whether the user can edit the information, etc.) is determined by identifying the user with the token. A token may include the authority of the user. When the electronic device 20 communicates with the information processing system 10 through the use of a token, the number of authentications can be reduced, thereby increasing the convenience of the user and preventing leakage of a password and the like.

<About Authentication Library>

Figure 7:
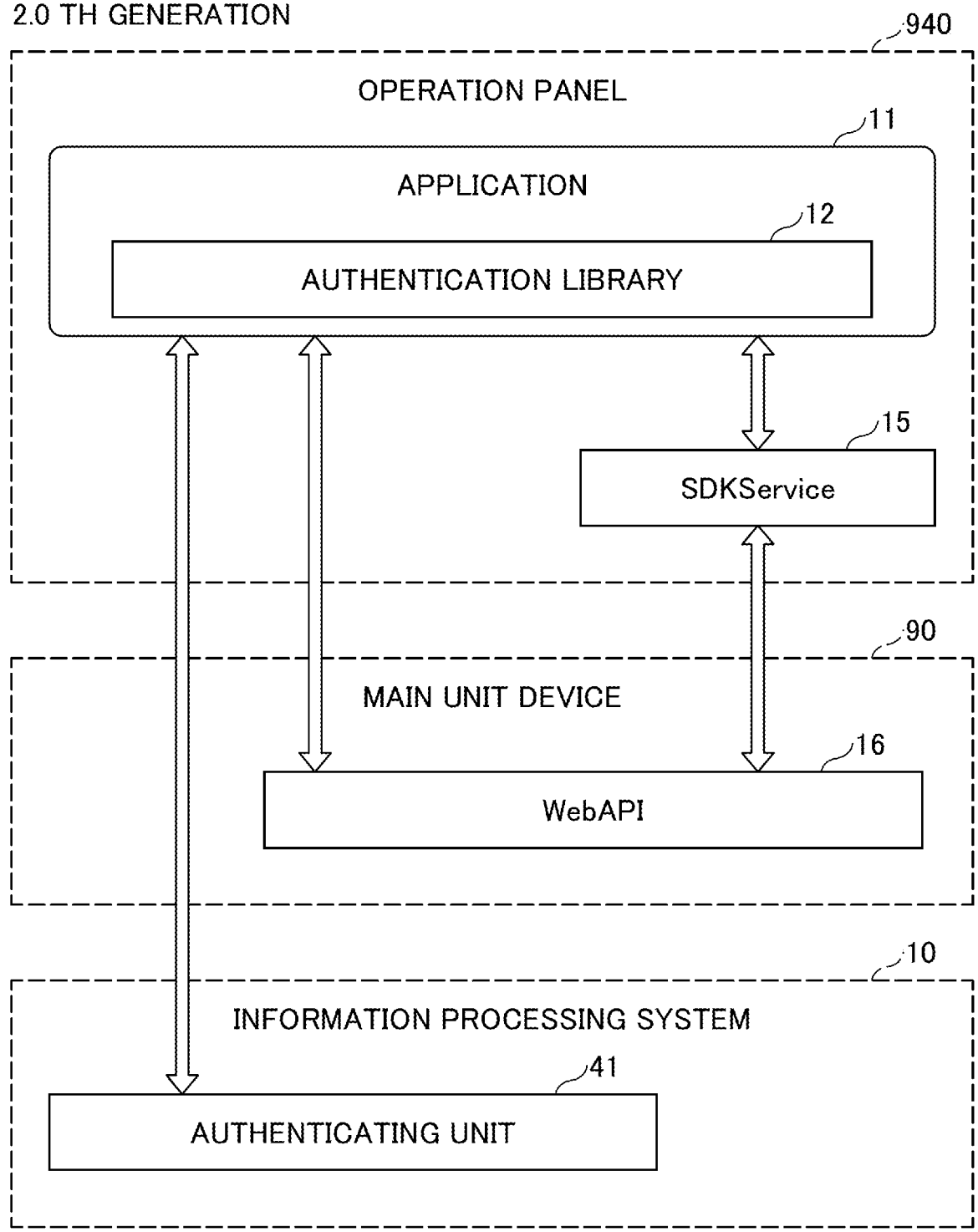
FIG. 7 is an example of the software configuration diagram of the operation panel (version N) according to an embodiment of the present invention.
Figure 8:
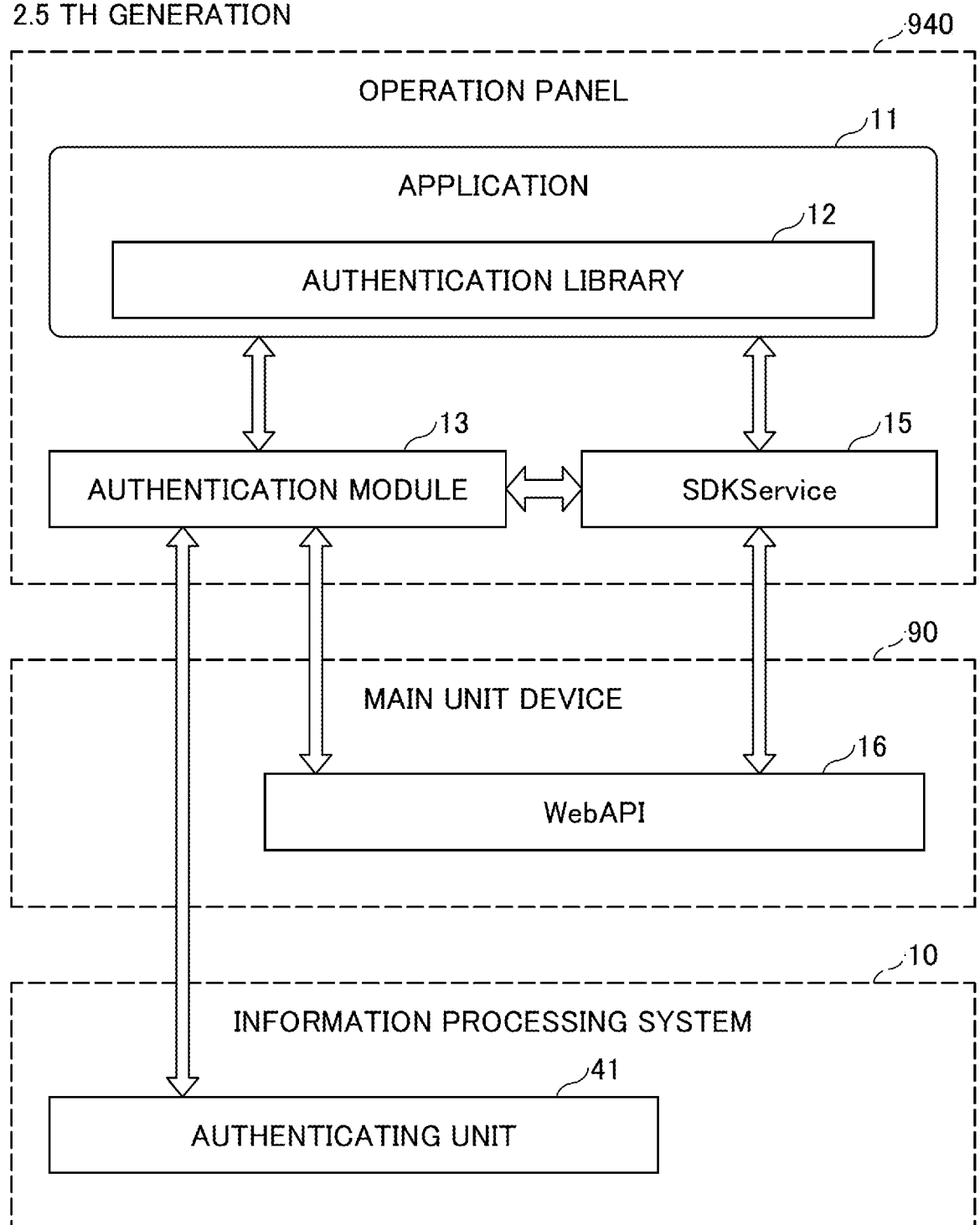
FIG. 8 is an example of a software configuration diagram of an operation panel (version N+α) according to an embodiment of the present invention.

Next, the authentication library 12 of the operation panel 940 will be described with reference to FIGS. 7 and 8. FIGS. 7 and 8 both illustrate the software configuration of the operation panel 940, but with different versions of the operating system operating in the operation panel 940. The version of the OS of FIG. 7 is N, and the version of the OS of FIG. 8 is N+α. That is, the version of the OS of FIG. 8 is newer than that of FIG. 7.

In the present embodiment, the generation (G) of the operation panel 940 is distinguished by the version of the OS installed in the operation panel 940. Generations of the operation panel 940 include, for example, G1, G2, and G2.5. There are various criteria for distinguishing the generations of the operation panel 940, one of which is the presence or absence of the authentication module 13. Once the version of each operating system is known, the generation of the operation panel 940 is known.

As described above, each application 11 includes one or more libraries. Although there may be several types of libraries, in the present embodiment, the authentication library 12 will be described as an example. The authentication library 12 communicates with the information processing system 10 to perform authentication-related processing. Accordingly, each application 11 includes the authentication library 12.

The authentication library 12 performs different control according to the version of the OS. On the other hand, the first stage of authentication for a user to log in to the electronic device 20 is common among different versions of the operating system. The authentication library 12 authenticates a user who has logged in to the electronic device 20 by using the authentication information input to the authentication screen as the first stage of authentication. Authentication refers to the determination of whether a user is a valid authorized person. The first stage of authentication is performed to determine whether the user is authorized to use the electronic device 20. Upon successful authentication, the user logs in to the electronic device 20. Login is an authentication activity that uses pre-registered authentication information to access system resources when using various services of a computer or on the Internet. Authentication information includes a user ID and a password, an IC (integrated circuit) card number, biometric information, and the like.

For version N: The authentication library 12 provides the application 11 with an API for the second stage of authentication. The authentication library 12 performs license authentication to confirm that the user is authorized to use the application 11 (the tenant has purchased the application 11);

As the second stage of authentication, the authentication library 12 communicates with the authenticating unit 41 of the information processing system 10 by using the authentication information input to the authentication screen to perform user authentication (acquisition of a token or the like). The authentication method may be the same as that of the first stage of authentication.

If the application 11 is out of license in the information processing system 10 or the authentication library 12 fails to acquire a token, the authentication library 12 displays an error screen and prevents the application from being activated.

The user ID and password may be different in the first stage and the second stage. For this reason, the user may need to perform authentication operations two times. As a method for reducing the times of performing authentication operations, single sign-on, such as OpenID, OAuth, SAML (Security Assignment Markup Language), and the like, may be performed.

For version N+α: The authentication library 12 provides an API for the second stage of authentication to the application 11. There is an authentication module 13 in this version, and, therefore, the authentication library 12 cooperates with the authentication module 13 to perform the second stage of authentication. Cooperating means that the authentication module 13 performs the second stage of authentication in response to a request from the authentication library 12. That is, the authentication module 13 essentially performs the second stage of authentication.

In addition to the second stage of authentication (license authentication, user authentication) performed by the authentication library 12, the authentication module 13 performs the following processing that is not performed by the authentication library 12. Upon success of the second stage of authentication, when the authentication module 13 receives a token from the authenticating unit 41, the logged-in user ID of the first stage of authentication and the token are stored (cached) in association with each other.

The next time the user logs in to the electronic device 20 at the first stage of authentication, if the user ID is associated with the token, the authentication module 13 activates the application 11 without displaying the authentication screen. The authentication module 13 allows the application 11 to be used without performing the second stage of authentication, for example, when the same user activates the application 11 (the type of application may be different) within a certain period of time (for example, 24 hours after logging in to the information processing system 10).

The SDK service 15 provides an API for hardware control of the main unit device 90 which is available for use only from the operation panel 940. The SDK service 15 converts a hardware control request from the application 11 into a format acceptable by the web API and transmits the request to the main unit device 90. By using the SDK service 15, the application 11 does not need to convert the hardware control request into a format that is acceptable by the web API.

The web API 16 provides each function of the main unit device 90 in a web API format.

<Operation Procedure>

Figure 9B:
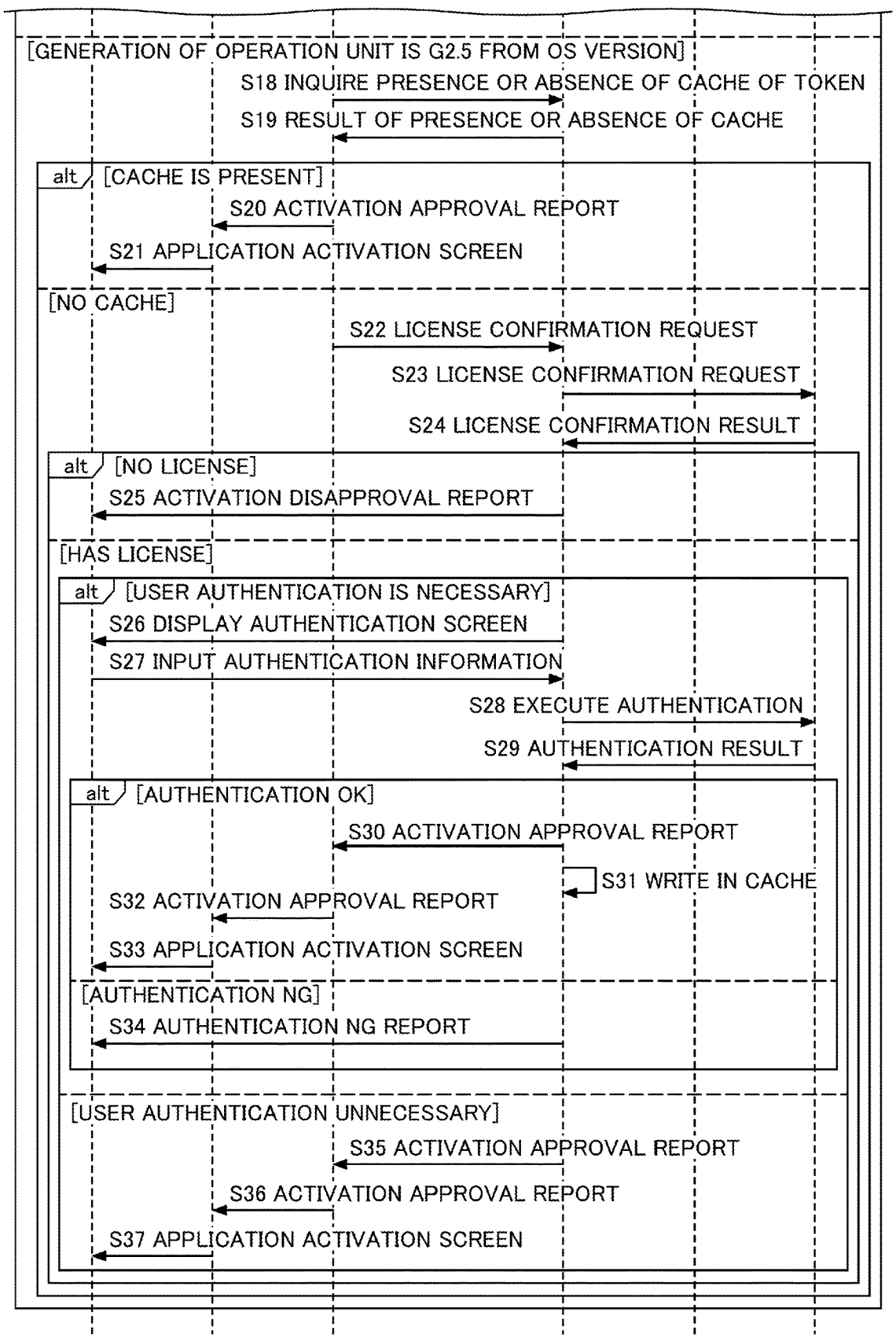
FIG. 9B is an example of a sequence diagram illustrating how the authentication library switches the authentication process according to the version of the OS according to an embodiment of the present invention.

FIGS. 9A and 9B is an example of a sequence diagram illustrating a procedure in which the authentication library 12 switches the authentication process in accordance with the version of the OS.

S1: The user makes a request to activate the application 11. The OS accepts the request to activate the application 11.

S2: The OS reports the activation request to the application 11 for which the user has made the activation request. The application 11 is not activated at this time point.

S3: The application 11 for which the activation request is given, calls the authentication library 12 and requests to inquire the version of the OS.

S4 and S5: The authentication library 12 sends a query to the OS to inquire about the version and acquires the version from the OS. The authentication library 12 determines, based on the version of the OS, whether the authentication module 13 is installed, and controls whether the authentication module 13 is to perform a process as the predefined process, according to whether the authentication module 13 is installed.

FIG. 10 is a diagram illustrating an example of a format of a version inquiry. As illustrated in FIG. 10, there is an association relationship between the version of the OS and each of the generations G1, G2, and G2.5 of the operation panel 940 as follows.

G2: Android 2.3.3 (registered trademark)
G2: Android 4.2.3 (registered trademark)
G2.5: Android 6.0.1 (registered trademark)

In the present embodiment, it is assumed that G2 and G2.5 are different in terms of whether the authentication module 13 is present or absent. Accordingly, the authentication library 12 determines whether the version of the OS is less than 6.01. The authentication library 12 acquires true if the version of the OS is less than 6.01, and acquires false if the version of the OS is not less than 6.01.

Rather than having the authentication library 12 send the query to the OS, the presence or absence of the authentication module 13 may be determined.

Referring back to FIG. 9A, the explanation will be continued.

S6 and S7: If the OS version is less than 6.01, the authentication module 13 is not installed in the operation panel 940. First, the authentication library 12 specifies the user ID input to the electronic device 20 and sends a query to the information processing system 10 to inquire whether the user has a license to log in to the electronic device 20. There are cases where the information processing system 10 has associated the user information of the electronic device 20 with the user information of the information processing system 10, and it may be possible to confirm whether the user can log in on-premise.

S8: If the user does not have a license to log in to the electronic device 20, the authentication library 12 displays a message indicating that the application 11 cannot be activated, on the operation panel 940.

S9: If a user has a license to log in to the electronic device 20, the authentication library 12 determines whether user authentication is required. That is, it is determined whether the authentication library 12 stores the user ID and the like of the information processing system 10 in association with the user who has logged in to the electronic device 20. When the user who has logged in to the electronic device 20 and the user ID and the like of the information processing system are stored in association with each other, the authentication by the information processing system 10 is not required. This is because this indicates that the user has been able to log in to the information processing system 10 in the past.

If authentication by the information processing system 10 is required, the authentication library 12 displays an authentication screen on the operation panel 940.

S10: The user inputs authentication information (user ID, password, etc.) with respect to the information processing system 10, using the operation panel 940. The operation accepting unit 22 receives these inputs.

S11: The authentication library 12 specifies authentication information and requests the information processing system 10 to perform authentication.

S12: The communication unit 42 of the information processing system receives the authentication execution request, and the authenticating unit 41 performs user authentication with the authentication information. The communication unit 42 transmits the authentication result (authentication OK or authentication NG, i.e., authentication not OK) to the electronic device 20.

S13: In the case of authentication OK, the authentication library 12 sends a report to the application 11 that activation is approved. The authentication library 12 stores the user who has logged in to the electronic device 20 in association with the user ID and the like of the information processing system.

S14: The application 11 displays an application activation screen, and the application 11 is activated.

S15: In the case of authentication NG, the authentication library 12 displays a message indicating that authentication is NG on the operation panel 940.

S16 and S17: When authentication by the information processing system 10 is not required, the authentication library 12 activates the application 11 similarly to steps S13 and S14.

On the other hand, if the version of the OS is 6.01 or higher, the authentication module 13 is present in the operation panel 940. Therefore, the authentication module 13 performs the processing relating to authentication.

S18: The authentication library 12 first sends a query to the authentication module 13 to inquire whether there is any token that is associated with the user ID that is logged in to the electronic device 20.

S19: The authentication library 12 acquires information indicating the presence or absence of the cache of a token from the authentication module 13. Note that the authentication library 12 may use the token even when the token is associated with the application 11 other than the application 11 that the user wishes to activate.

S20: When a token is stored, authentication by the information processing system 10 is not required. Therefore, the authentication library 12 reports to the application 11 that activation is approved.

S21: The application 11 displays an application activation screen, and the application 11 is activated.

S22: If the token is not stored, the authentication library 12 first requests the authentication module 13 to confirm whether the user has the license to log in to the electronic device 20.

S23 and S24: The authentication module 13 specifies the user ID input to the electronic device 20 and sends a query to the information processing system to inquire whether the user has a license to log in to the electronic device 20.

S25: If the user has no license to log in to the electronic device 20, the authentication module 13 displays a message indicating that the application 11 cannot be activated, on the operation panel 940.

S26: When a user has a license to log in to the electronic device 20, in this case, the token is not stored, so it is determined whether the authentication module stores the user ID and the like of the information processing system 10 in association with the user who has logged in to the electronic device 20.

If the authentication module 13 does not store a user ID or the like of the information processing system 10 associated with the logged-in user, the authentication library 12 displays an authentication screen on the operation panel 940.

S27: The user inputs authentication information (user ID, password, etc.) with respect to the information processing system 10, in the operation panel 940. The operation accepting unit 22 receives these inputs.

S28: The authentication module 13 specifies the authentication information and requests the information processing system 10 to perform authentication.

S29: The communication unit 42 of the information processing system receives the authentication execution request, and the authenticating unit 41 performs user authentication with the authentication information. The communication unit 42 transmits the authentication result (authentication OK or authentication NG) to the electronic device 20.

S30: In the case of authentication OK, the authentication module 13 reports to the authentication library 12 that activation is approved.

S31: The authentication module 13 stores the user ID of the electronic device 20 and token in association with each other. Further, the authentication module 13 may store the user ID of the electronic device 20 and the user ID of the information processing system 10 in association with each other.

S32: The authentication library 12 reports that activation is approved to the application 11.

S33: The application 11 displays an application activation screen, and the application 11 is activated.

S34: In the case of authentication NG, the authentication module 13 displays a message that authentication is NG on the operation panel 940.

S35: Even if the token is not stored, if the authentication module 13 stores the user ID and the like of the information processing system 10 in association with the logged-in user, user authentication is not required. In this case, the authentication module 13 sends a report to the authentication library 12 that activation is approved.

S36: The authentication library 12 reports to the application 11 that activation is approved.

S37: The application 11 displays an application activation screen, and the application 11 is activated.

Thus, according to the version of the OS, the authentication library 12 of the electronic device 20 switches between performing authentication or requesting the authentication module 13 to perform authentication, and, therefore, even if the version of the OS is different, the electronic device 20 can operate the same authentication library 12.

<Main Effects>

As described above, the electronic device 20 according to the present embodiment can use the authentication library 12 having the same function regardless of the version of the platform, such as the OS. The authentication library 12 can be the same, and, therefore, the developer of the application 11 can release the application 11 of the same binary even if the version of the OS is changed, so that a reduction in development and maintenance costs can be expected. Also, the developer of the authentication library 12 can integrate the authentication libraries 12 to be developed or maintained regardless of the version of the platform, such as the OS, so that a reduction in development and maintenance costs can be expected.

<Other Applications>

The electronic device, the library, and the processing method are not limited to the specific embodiments described in the detailed description, and variations and modifications may be made without departing from the spirit and scope of the present invention.

For example, in the present embodiment, the application 11 includes the functions of the authentication module 13, but the application 11 may include the functions of the SDK service 15 in a library. In this case, the library controls whether to perform the processing of the SDK service 15 according to the version of the OS.

Further, the configuration example of FIG. 6, etc., indicated in the above embodiment is divided according to the main functions to facilitate the understanding of processes by the electronic device 20 and the information processing system 10. The present invention is not limited by how the process units are divided or the names of the process units. The processes of the electronic device 20 and the information processing system 10 may be further divided into many process units according to the process contents. Furthermore, the process units may be divided such that a single process unit further includes many processes.

Also, the apparatus group described in the examples are merely indicative of one of a plurality of computing environments for carrying out the embodiments disclosed herein. In some embodiments, the information processing system 10 includes a plurality of computing devices, such as server clusters. The plurality of computing devices are configured to communicate with each other via any type of communication link, including networks, a shared memory, and the like, and perform the processes disclosed herein.

The functions of each of the embodiments described above may be implemented by one or more processing circuits. As used herein, a "processing circuit" includes a processor programmed to execute each function by software such as a processor implemented in an electronic circuit; or devices such as an Application Specific Integrated Circuit (ASIC) a digital signal processor (DSP), a field programmable gate array (FPGA), and a conventional circuit module, designed to execute each function as described above.

According to one embodiment of the present invention, an electronic device capable of using a library of the same version even when the version of the platform changes, is provided.

What is claimed is:

1. An electronic device configured to communicate with an information processing system via a network, the electronic device comprising:
   circuitry; and
   a memory storing computer-executable instructions that cause the circuitry to execute:
   executing an application operating on a platform of the electronic device, wherein
   the application includes a library,
   the library controls whether to perform a predefined process, based on version information of the platform acquired from the platform,
   the library determines, based on the version information of the platform, whether a module configured to cooperate with the library is installed,
   the library controls whether to perform a process to be performed by the module, as the predefined process, according to whether the module is installed,
   the library requests the module to perform the predefined process, in response to determining that the module is installed,
   the predefined process is an authentication process for authenticating a user with respect to the information processing system,
   the module stores a token transmitted from the information processing system in association with the user who has logged in to the electronic device, in response to determining that the authentication process for authenticating the user with respect to the information processing system is successful, and
   the circuitry is further caused to execute:
   activating the application without performing the authentication process for authenticating the user with respect to the information processing system, in response to determining that the token is stored; and
   activating the application without performing the authentication process for authenticating the user with respect to the information processing system, in response to determining that the user who has logged in to the electronic device and the user of the information processing system are associated with each other in the module, even when the token is not stored in the module.

2. The electronic device according to claim 1, wherein the library performs the predefined process to be performed by the module, in response to determining that the module is not installed.

3. The electronic device according to claim 1, wherein the circuitry is further caused to execute:
   activating the application without performing the authentication process for authenticating the user with respect to the information processing system, in response to determining that the user who has logged in to the electronic device and the user of the information processing system are associated with each other in the library.

4. A non-transitory computer-readable medium storing an application that operates on a platform, the application including a library, wherein
   the library is configured to cause an electronic device in which the application is installed, to perform a process of controlling whether to perform a predefined process based on version information of the platform acquired from the platform, the electronic device configured to communicate with an information processing system via a network,
   the library determines, based on the version information of the platform, whether a module configured to cooperate with the library is installed,
   the library controls whether to perform a process to be performed by the module, as the predefined process, according to whether the module is installed,
   the library requests the module to perform the predefined process, in response to determining that the module is installed,
   the predefined process is an authentication process for authenticating a user with respect to the information processing system,
   the module stores a token transmitted from the information processing system in association with the user who has logged in to the electronic device, in response to determining that the authentication process for authenticating the user with respect to the information processing system is successful,
   the application is activated without performing the authentication process for authenticating the user with respect to the information processing system, in response to determining that the token is stored, and
   the application is activated without performing the authentication process for authenticating the user with respect to the information processing system, in response to determining that the user who has logged in to the electronic device and the user of the information processing system are associated with each other in the module, even when the token is not stored in the module.

5. A processing method performed in an electronic device configured to execute an application operating on a platform of the electronic device, the application including a library that controls whether to perform a predefined process, based on version information of the platform acquired from the platform, the electronic device configured to communicate with an information processing system via a network, the predefined process being an authentication process for authenticating a user with respect to the information processing system, the processing method comprising:

causing the library to determine, based on the version information of the platform, whether a module configured to cooperate with the library is installed, causing the library to control whether to perform a process to be performed by the module, as the predefined process, according to whether the module is installed, causing the library to request the module to perform the predefined process, in response to determining that the module is installed, causing the module to store a token transmitted from the information processing system in association with the user who has logged in to the electronic device, in response to determining that the authentication process for authenticating the user with respect to the information processing system is successful, activating the application without performing the authentication process for authenticating the user with respect to the information processing system, in response to determining that the token is stored, and activating the application without performing the authentication process for authenticating the user with respect to the information processing system, in response to determining that the user who has logged in to the electronic device and the user of the information processing system are associated with each other in the module, even when the token is not stored in the module.

* * * * *